United States Patent
Evanitsky

(10) Patent No.: US 8,744,522 B2
(45) Date of Patent: Jun. 3, 2014

(54) PORTABLE SECURITY SYSTEM BUILT INTO CELL PHONES

(75) Inventor: Eugene Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 612 days.

(21) Appl. No.: 12/582,931

(22) Filed: Oct. 21, 2009

(65) Prior Publication Data

US 2011/0092248 A1   Apr. 21, 2011

(51) Int. Cl.
    *H04M 1/00*   (2006.01)
(52) U.S. Cl.
    USPC .................................. 455/556.1; 340/539.22
(58) Field of Classification Search
    USPC .............. 455/456.6, 556.1, 404.1; 340/539.1, 340/539.22, 539.25, 524; 348/143; 382/103
    See application file for complete search history.

(56) References Cited

U.S. PATENT DOCUMENTS

| | | | |
|---|---|---|---|
| 6,049,274 A | 4/2000 | Stachurski | |
| 6,239,700 B1 | 5/2001 | Hoffman et al. | |
| 7,026,928 B1 | 4/2006 | Lane | |
| 2003/0151672 A1* | 8/2003 | Robins et al. | 348/208.6 |
| 2005/0063598 A1* | 3/2005 | Sen et al. | 382/232 |
| 2005/0221796 A1 | 10/2005 | Pellegrino et al. | |
| 2006/0187024 A1 | 8/2006 | Azimi et al. | |
| 2007/0252720 A1 | 11/2007 | Hughes et al. | |
| 2010/0202661 A1* | 8/2010 | Mizutani | 382/103 |

FOREIGN PATENT DOCUMENTS

WO   WO 2010036091 A2 *   4/2010

* cited by examiner

*Primary Examiner* — Nathan Taylor
(74) *Attorney, Agent, or Firm* — Fay Sharpe LLP

(57) ABSTRACT

A portable security system includes an image capturing module for capturing one or more images and an image analysis module in operable communication with the image capturing module, the image analysis module configured to (i) recognize, from the one or more images captured, one or more events related to detection of moving objects, (ii) selectively identify a finite number of spatial relationships of the moving objects, and (iii) analyze the one or more images within the portable security device to classify the finite number of spatial relationships of the moving objects corresponding to predefined moving object data stored on a data storage unit located within the portable security device. Also, an image transmission module for transmitting the one or more images recognized, selectively identified, and analyzed by the image analysis module to one or more external sources is provided.

19 Claims, 4 Drawing Sheets

PORTABLE SECURITY SYSTEM BUILT INTO CELL PHONES

BACKGROUND

1. Field of the Related Art

The present disclosure relates to personal security systems, and more particularly, to a bidirectional wireless communication security system having motion detection and image recognition capabilities incorporated therein.

2. Background of the Related Art

Personal security remains a concern in many parts of the world. Many households include security systems to prevent harm to persons, or theft of property, or both. Unfortunately, known home security systems are not portable. Thus, when people leave their homes, they risk injury to their person, or theft of their property, or both. For example, people often travel away from home and stay in hotels or similar accommodations. Moreover, many people live in apartments, dormitories and similar rental units. Often, these types of dwellings do not include security systems that are found in many homes. Moreover, many hotels, dormitories, and apartments may have security personnel on duty to watch for suspicious individuals or activity on the premises. Unfortunately, in spite of the noted attempts to deter and prevent crime to persons and property, such crimes still occur on a consistent basis.

When an individual encounters an emergency situation, their only currently available option is to use a telephone to call 911. However, valuable time is wasted dialing, and further time is lost explaining to the operator the identity of the individual, the individual's location, and the nature of the problem. Meanwhile, wireless devices, such as cellular phones or personal data accessories (PDAs), have quickly become ubiquitous. Such devices are currently used as communications tools, for example to call other people or to download e-mail regardless of location.

Thus, it would be highly advantageous to employ the advantages of wireless technology to provide new and enhanced security services.

SUMMARY

It is an aspect of the present disclosure to provide a system including an image capturing module for capturing one or more images; an image analysis module in operable communication with the image capturing module, the image analysis module configured to (i) recognize, from the one or more images captured, one or more events related to detection of moving objects, (ii) selectively identify a finite number of spatial relationships of the moving objects, and (iii) analyze the one or more images within the portable security device to classify the finite number of spatial relationships of the moving objects corresponding to predefined moving object data stored on a data storage unit located within the portable security device; and an image transmission module for transmitting the one or more images recognized, selectively identified, and analyzed by the image analysis module to one or more external sources.

It is an another aspect of the present disclosure to provide a method for providing security via a portable security device including capturing one or more images; recognizing, from the one or more images captured, one or more events related to detection of moving objects; selectively identifying a finite number of spatial relationships of the moving objects; analyzing the one or more images within the portable security device to classify the finite number of spatial relationships of the moving objects corresponding to predefined moving object data stored on a data storage unit located within the portable security device; and transmitting the one or more images recognized, selectively identified, and analyzed to one or more external sources.

It is an another aspect of the present disclosure to provide a system for providing security via a portable security device, including a computing device; a computer-readable storage medium in communication with the computing device, the computer-readable storage medium comprising one or more programming instructions for: capturing one or more images; recognizing, from the one or more images captured, one or more events related to detection of moving objects; selectively identifying a finite number of spatial relationships of the moving objects; analyzing the one or more images within the portable security device to classify the finite number of spatial relationships of the moving objects corresponding to predefined moving object data stored on a data storage unit located within the portable security device; and transmitting the one or more images recognized, selectively identified, and analyzed to one or more external sources.

The present disclosure also provides a computer-readable medium which stores programmable instructions configured for being executed by at least one processor for performing the methods described herein according to the present disclosure. The computer-readable medium may include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

Figure 1:
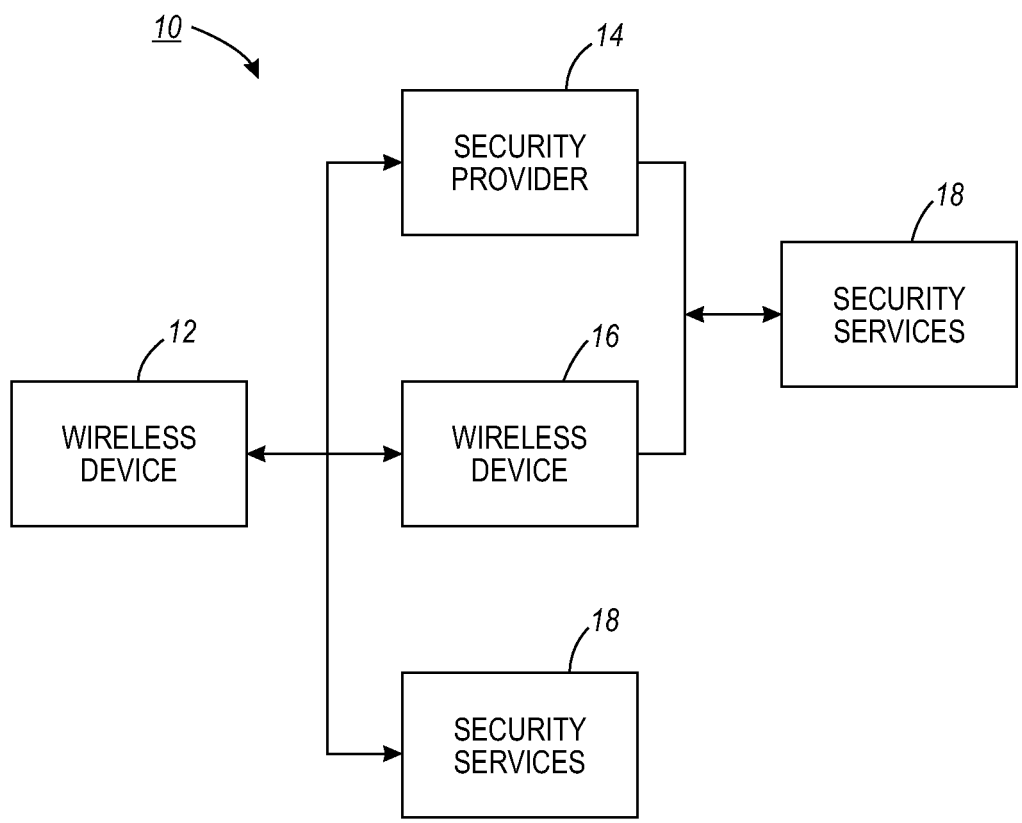
FIG. 1 is a block diagram of a security system employing a wireless device in communication with a security provider, security services, and/or other wireless devices, in accordance with the present disclosure.

In the following detailed description, example embodiments disclosing specific details are set forth in order to provide an understanding of the present disclosure. The example embodiments are set forth for purposes of explanation and not limitation. Those of ordinary skill in the art will understand that various changes in form and details may be made to the example embodiments without departing from the scope of the present disclosure. Moreover, descriptions of well-known devices, methods, systems, and protocols may be omitted so as to not obscure the description of the example embodiments. Nonetheless, such devices, methods, systems and protocols that are within the purview of those of ordinary skill in the art are contemplated by the example embodiments.

The present disclosure provides a security system that takes advantage of personal wireless technology to provide enhanced security for individuals. The system includes a wireless communications device, which may be for example a cell phone or a personal digital assistant (PDA). A security provider is capable of responding to contact from a user of the wireless communications device to ascertain the identity of the user and the location of the user of the wireless communications device. In the event that the device detects what it believes is an emergency situation, the device may communicate directly to the security provider (or to another recipient). The user is not involved at this point. The user may not be present or may be in no condition to communicate. Thus, the device may automatically send out the user details. The security provider may then contact an emergency response center to provide aid to the user of the wireless communications device. The present disclosure further describes a security system using a portable device such as a cell phone or other network connected handheld device, with a built in camera that is low cost and easy to configure. The camera may feed a program built into the camera to detect motion and analyze images that may be used to trigger one of several different actions pre-configured by the user.

In accordance with a further aspect of the disclosure, the security provider may be capable of automatically ascertaining the location of the user of the wireless communications device in response to the contact, for example via a global positioning system (GPS). According to a further aspect of the disclosure, the wireless communications device is capable of capturing and analyzing images in a real-time and automatic manner. The security provider may be further capable of ascertaining information about the user's emergency situation in response to the captured and analyzed images automatically provided by the cell phone. Sending images over a phone line, or even a network can be painfully slow which is why the device itself is required to be able to analyze the images enough to determine if there is an emergency situation so that it may go to the response as quickly as possible. Once the alert has gone out, it can transmit all the images and audio that it has obtained. Software on the security provider side can do a more detailed analysis of the image. The requirement here is for the security device to notify someone as quickly as possible. A more detailed analysis can take place on the security server or by whomever receives the data/information.

In accordance with an example embodiment, a portable security system includes a portable wireless link. The portable security system also includes a portable motion detector, which is adapted to receive control signals from the portable wireless link, and which is adapted to communicate a signal when a security breach occurs. Additionally, the portable security systems include a memory or storage, which is adapted to receive a code indicating the location of the portable motion detector. The motion detector is embedded within or incorporated within the image analysis module, which is configured to recognize a plurality of events and trigger a plurality of actions based on the plurality of events.

In accordance with another example embodiment, a method of providing security includes providing a portable wireless link and a portable motion detector and transmitting control signals from the portable wireless link. The portable motion detector may be able to actively look for or anticipate specific suspect motions. The method also includes providing a code to the portable wireless link, where the code includes a location of the portable motion detector. In addition, the method includes communicating a signal from the portable wireless link when a security breach occurs.

In accordance with another example embodiment, a portable security system includes a portable wireless link and a portable motion detector. The personal motion detector may be adapted to receive control signals from the personal wireless link. When the portable motion detector is activated, the portable wireless link may be caused to transmit one or more alarm signals indicating that a security breach has occurred. In some cases, the security system further includes an audible alarm indicating that a security breach has occurred.

Prior to describing the present disclosure in further detail, it will first be helpful to define various terms that will be used throughout the following discussion. For example:

The term "image" may refer to a picture taken by an image capturing device. The term "image" may also refer to still images (static images) or moving images, such as movies, videos, etc. The term "image" may refer to any type of visual or non-visual (e.g., acoustical) data or information collected or gathered by the image capturing device. The term "image" may refer to any type of collection of facts, observations, or measurements from which conclusions may be drawn.

The term "storage" may refer to data storage. "Data storage" may refer to any article or material (e.g., a hard disk) from which information is capable of being reproduced, with or without the aid of any other article or device. "Data storage" may refer to the holding of data in an electromagnetic form for access by a computer processor. Primary storage is data in random access memory (RAM) and other "built-in" devices. Secondary storage is data on hard disk, tapes, and other external devices. "Data storage" may also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "module" may refer to a self-contained component (unit or item) that is used in combination with other components and/or a separate and distinct unit of hardware or software that may be used as a component in a system, such as a portable security system including motion detection and image recognition capabilities. The term "module" may also refer to a self-contained assembly of electronic components and circuitry, such as a stage in a computer that is installed as a unit.

The term "analyze" may refer to determining the elements or essential features or functions or processes of one or more portable security devices for computational processing. The term "analyze" may further refer to tracking data and/or collecting data and/or manipulating data and/or examining data and/or updating data on a real-time basis in an automatic manner and/or a selective manner and/or manual manner.

The term "notification" may refer to a visual or audible indication alerting the user of various status conditions relating to portable security systems. "Notification" is the act of notifying someone of something or making a formal announcement. "Notification" may also refer to the warning or announcing of something, usually done in advance.

The term "processing" may refer to determining the elements or essential features or functions or processes of one or more portable security devices for computational processing. The term "process" may further refer to tracking data and/or collecting data and/or manipulating data and/or examining data and/or updating data on a real-time basis in an automatic manner and/or a selective manner and/or manual manner.

The term "software application" may refer to any type of tool that functions and is operated by means of a computing device/component, with the purpose of supporting or improving the software user's work/tasks. The term "software application" may also refer to a subclass of computer software that employs the capabilities of a computer directly and thoroughly to a task that the user wishes to perform. The term "software application" may further refer to a program or group of programs designed for end users. Application software may include any type of database programs, word processing programs, and/or spreadsheet programs.

With reference to FIG. 1, a block diagram of a security system employing a wireless device in communication with a security provider, security services, and/or other wireless devices, in accordance with the present disclosure is presented.

In FIG. 1, the system is designated generally by reference numeral 10 and includes a wireless device 12 in communication with a security provider 14, a second wireless device 16, and security services 18.

Regarding the system 10, a user may use a wireless device 12 (e.g., a cell phone or other mobile device having a camera) as a simple, low cost, low feature, low to medium security device 10. The user may aim the camera 22 (see FIG. 2), which could be partially concealed, at a door or window of a room (e.g. hotel room or in a car). If the camera 22 detects motion, fire or a struggle, then it triggers an alarm or notification. The exemplary embodiments utilize the wireless device's 12 built in ability to record moving images, take still photos, and to communicate bi-directionally.

A user may carry the wireless device 12 to any destination and the wireless device 12 may be any of several known types. For example, the wireless device 12 may be a cellular phone employing, for example but not limited to, CMTS, UMTS, or GSM cellular technology. Alternatively, the wireless device 12 may be a wireless networking phone employing for example 802.11 technologies, or may be a wireless PDA device employing a proprietary packet radio protocol. The present disclosure is not limited to the capabilities of current wireless devices and may be continually employed as wireless technologies evolve.

The wireless device 12 may be in wireless contact with a security provider 14. The security provider 14 may be employed within an existing service provider, such as a cellular phone service provider, or a wireless networking provider, or a satellite phone or networking provider. Alternately, the security provider 14 may be an independent provider for the primary purpose of providing individual security services. In accordance with an aspect of the present disclosure, the services provided by the security provider 14 may vary depending upon the level of service and protection desired or required by the user of the wireless device 12, and/or the level of service the user 12 is willing to pay for.

The security provider 14 may be in communication with security services 18 (e.g., emergency response center). The security services 18 may be any of, and not limited to, a police station, a fire station, a hospital or paramedics, a private security company, or an individual having a second wireless device 16 as previously specified by the user of the wireless device 12.

For example, assume that the user finds himself or herself in a position of vulnerability where security is required. For instance, the user may have left the workplace and noticed that he/she is being followed by an individual. If the user has subscribed to a service level contract providing a high level of security services, the user may access his/her wireless device 12 and take a snapshot or a video that automatically connects him/her with a person at the security provider 14 and/or directly to security services 18. Once contacted by the subscriber, the security provider 14 and/or the security services 18 may ascertain the identity of the subscriber. If the user is using a cellular phone, the user identity may be ascertained by the calling phone number. If the user is using a wireless networking device, the identity of the user may be ascertained, for example, from the network address of the device or an application level identifier such as an e-mail address.

The user location may be obtained automatically through several different means. For example, the security provider 14 may automatically ascertain the user location. The user's wireless device 12 may be global positioning satellite (GPS) enabled. If so, the security provider 14 may use the GPS capability of the wireless device 12 to locate the user. For example, when subscribing for a contract, the user may provide a serial number or other identifying information (e.g., a phone number) to identify the user wireless device 12. This information may then be used in turn by the security provider 14 to locate the device via GPS. Once the security provider 14 has ascertained the identity of the user and the location of the user, this information may be passed on to the appropriate emergency response center or security services 18. As part of the configuration or arming process, the user may add more specific location information. For example, the GPS coordinates may indicate that the device in the Hyatt Regency Hotel in Rochester, N.Y. but the user may state the phone is in room 3217 so that information is transmitted with the emergency call.

In accordance with another aspect of the present disclosure, the user may contact another party having a second wireless device 16 in the event of an emergency. The second wireless device 16 may be, for example, the parent of a child user, a college roommate, a teacher, or a close friend or family member. In this case, in the event of an emergency, the security service 14 would contact either or both of an emergency response center or security services 18 and the second wireless device 16. Alternately, the device may also use text messaging as part of the response.

Figure 2:
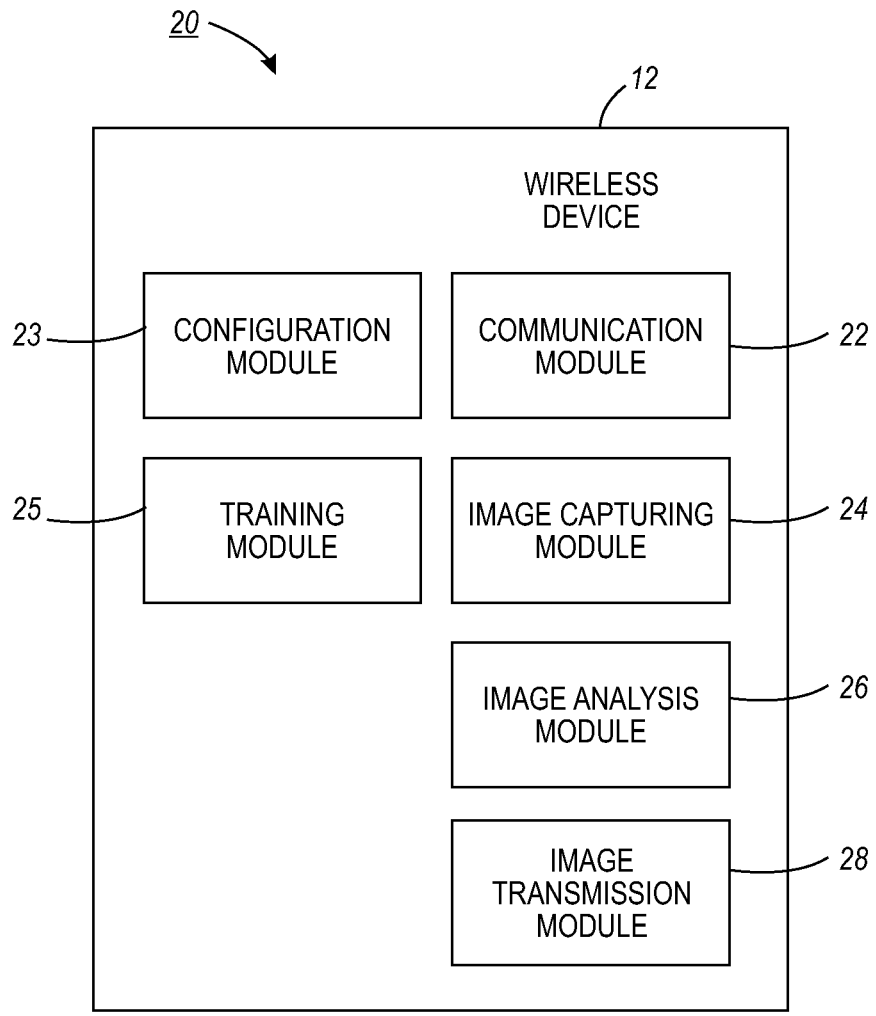
FIG. 2 is a schematic diagram of a wireless device having image capturing and image analysis capabilities embedded or incorporated therein, in accordance with the present disclosure.

With reference to FIG. 2, a schematic diagram of a wireless device having image capturing and image analysis capabilities embedded or incorporated therein, in accordance with the present disclosure is presented.

The wireless device 12 includes a bidirectional communication module 22, an image capturing module 24, an image analysis module 26, and an image transmission module 28. The wireless device 12 further may include a configuration module 23 and a training module 25. The device may also transmit still images, continuous live video and it may transmit audio since it has a receiver. Audio may provide further clues as to what is happening, and therefore, the proper response may be enacted.

The exemplary embodiments of the present disclosure further include wireless devices having photographic capabilities. Recently available cellular phones include, for example, cameras. The cameras or image capturing module 24 may be used to take digital photographs and send the data/information wirelessly over the cellular network to a chosen destination. Such cameras may be designated as image capturing modules 24. A user in possession of such a wireless device 12 having photographic capabilities may use it to his/her advantage in event of an emergency.

In the event of an emergency, after contacting the security services 18 in any manner previously described, the user may photograph his/her surroundings, or for example an assailant, and send the photographs to the security provider 14 and/or the security services 18, for example via pre-programmed keystrokes. Additionally, if the user is present, the user may point the camera to capture relevant information such as the face of the intruder. The user may also verbally recite sounds that the phone can pick up and send to the security service. But, even if the user is not present, the phone may continue to transmit video and voice. However there is no way to move the camera to point at something new. Thus, the intruder would not even know that his actions have been reported.

Once the security provider 14 and/or security services 18 are contacted by the user, the security provider 14 and/or security services 18 ascertain the identity and location of the subscriber, and receive and interpret the photographic data or image data received from the user. The photographic data may further aid the security provider 14 and/or security services 18 in determining the nature and location of the emergency, and may aid the security provider 14 and/or security services 18 in containing the appropriate emergency. Conveniently, the data/information transmitted to the security provider 14 and/or security services 18 are pre-analyzed, thus enabling faster determination of the emergency and quicker response times. The receiving service or server may also store the data/information that is being received for later analysis or proof (e.g., possibly as evidence).

Moreover, the signals or alerts or notifications of the communication module 22 may include a code that identifies the location of the portable security system 10. Illustratively, the code may identify the room of the guest to the hotel security personnel or the apartment of the lessee in an apartment to the police or security personnel or dormitory to the police or security personnel. For example, when a certain code number is transmitted to alert and/or notify the hotel security, hotel security personnel may be able to identify the name and room number of the guest corresponding to the code number that was transmitted. Likewise, when the code number is transmitted to alert the police or security department, the name and apartment/dormitory room number of the lessee corresponding to the code may be identified. Thus, after the transmission/receipt of the signal or alert or notification by the communication module 22, security personnel may respond directly to the location of the portable security system 10 and thus render aid.

Additionally, even if the system 10 is detected and destroyed, it may transmit enough data/information in a short period of time to be effective. If the system 10 is GPS enabled, this might be done automatically, but manual entry is also possible. The user, for example, may wish to input a hotel room number into the system 10 to help notify the hotel security whether an emergency situation arises. Concerning the response or alert or notification configuration, several options may be available to the user of the wireless device 12. For instance, a sound alarm could be used to include a voice message, such as "security has been alerted and is on the way" or a load buzzer may be used. Also, one could initiate call to another cell phone or to a security service, one could take still photos or movies and transmit them, and/or one could record and transmit sounds. Thus, images could be transmitted to another source, such as the owner's personal cell phone, that may then choose the next action to take. Since an online connection has been established, the client may speak into the phone to address the intruder or situation. Also, if the client is in the room when the intruder enters, the client may provide a name or other description to go along with the alert message. Furthermore, an alarm center may provide an oral response to the device that may also be played in a loud manner. Finally, multiple response options may be combined. For instance, one may immediately place a call for help along with the location, images and sound and/or the cell phone may sound an audible alarm or play a loud, pre-recorded message and/or the cell phone may connect to an alarm response center that may also play a live message on the phone's receiver.

The configuration module 23 may be used to select one or more conditions that are predetermined and require an automatic response. The user may be permitted to select a different response for each condition that occurs. For example, one condition may require contacting security services 18 only, whereas another condition may require contacting both security services 18 and security provider 14. Also, another condition may require contacting only the second wireless device 16. One skilled in the art may contemplate using a plurality of different configurations. Moreover, the training module 25 may be used to provide images of what the system 10 should look for. For example, the training module 25 may be programmed to determine whether a door or window has been left unlocked or becomes ajar. The training module 25 may be programmed to enable the system 10 to determine a plurality of different scenarios.

Additionally, the portable security system 10 is poised to protect an individual's personal effects. Illustratively, these personal effects include a wide variety of items, for example, such as luggage. As described herein, when the personal effects are disturbed or motion is otherwise detected in the motion detector's field of awareness, an alarm notifies appropriate personnel that a security breach has occurred.

In operation, portable security system 10 may be placed near an item to be protected. The security mode may be engaged, and the image analysis module 26 is in an active mode. In one example embodiment, the image analysis module 26 is sensitive to acceleration caused by movement or other physical contact. Thus, if one were to touch the item, the image analysis module 26 would be activated to send a notification or alert via the image transmission module 28.

Figure 3:
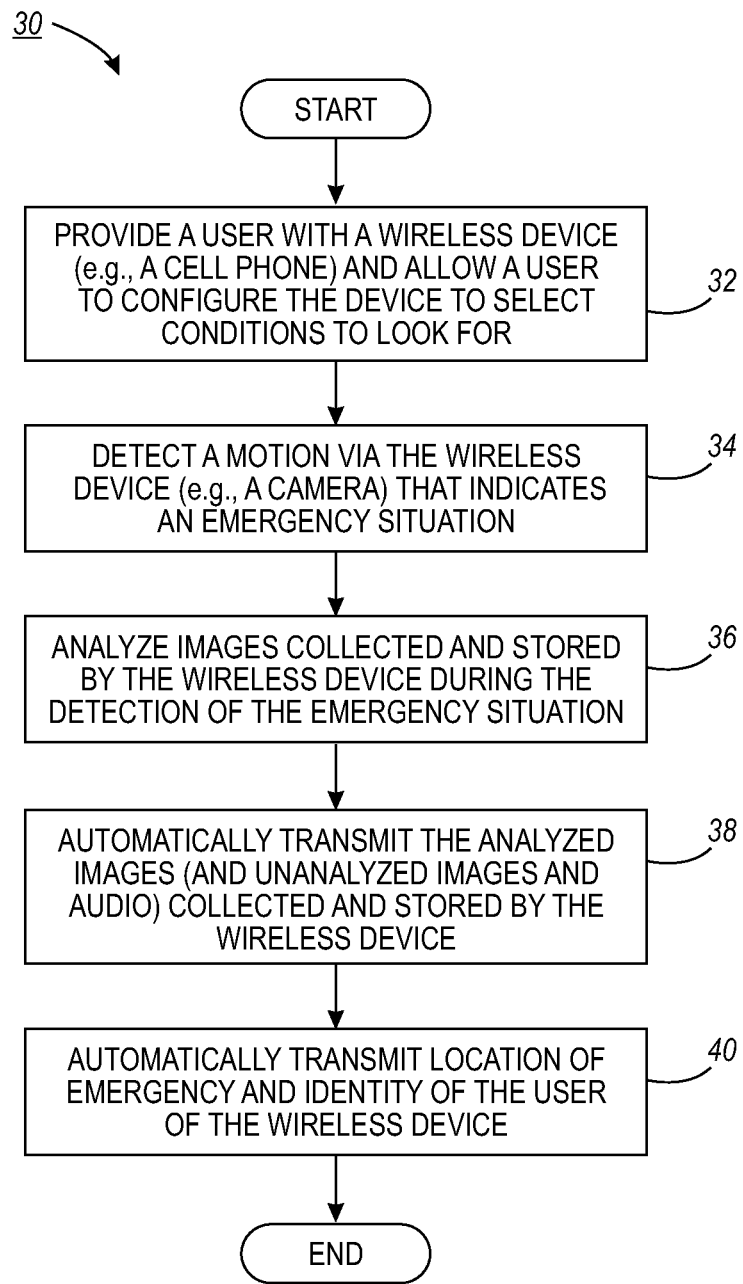
FIG. 3 is a flowchart of a method for allowing a user to bidirectionally communicate with one or more external sources by utilizing the wireless device, in accordance with the present disclosure.

With reference to FIG. 3, a flowchart of a method for allowing a user to bidirectionally communicate with one or more external sources by utilizing the wireless device, in accordance with the present disclosure is presented.

The flowchart 30 includes the following steps. In step 32, a user is provided with a wireless device 12, such as a cell phone. In step 34, a motion is detected via the wireless device 12 that indicates an emergency situation. In step 36, the images collected by the wireless device 12 are analyzed and stored by the wireless device 12 during the detection of the emergency situation. In step 38, the analyzed images collected are automatically transmitted by the wireless device 12. In step 40, the location of the emergency and the identity of the user are transmitted via the wireless device 12. The process then ends.

Figure 4:
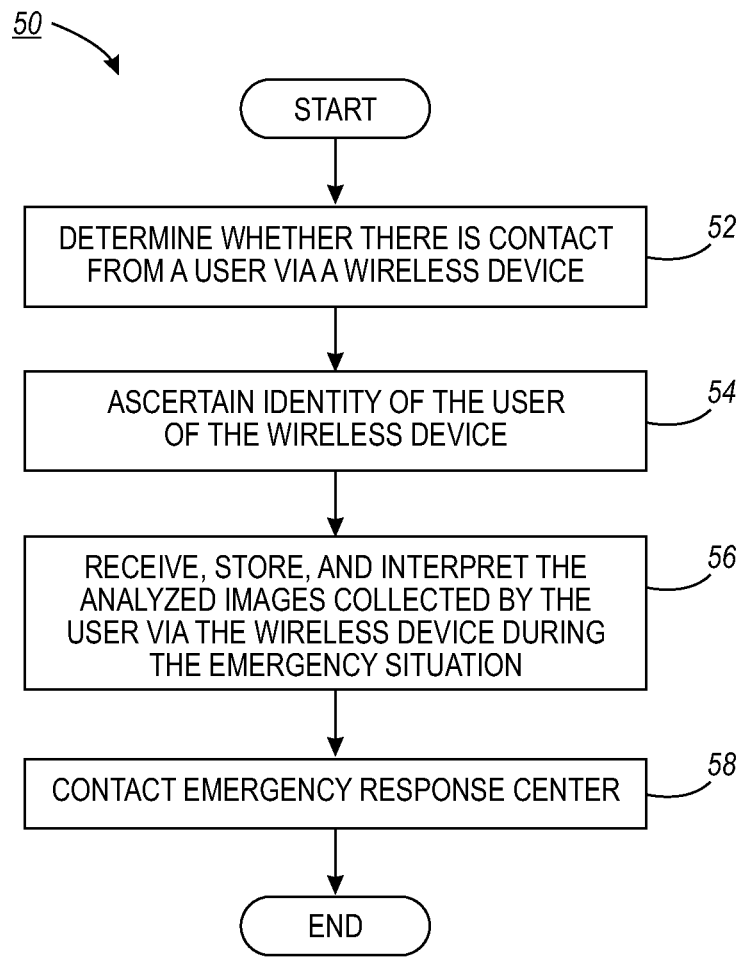
FIG. 4 is a flowchart of a method for allowing one or more external sources to receive, store, and interpret information received from the user utilizing the wireless device, in accordance with the present disclosure.

With reference to FIG. 4, a flowchart of a method for allowing one or more external sources to receive, store, and interpret information received from the user utilizing the wireless device, in accordance with the present disclosure is presented.

The flowchart 50 includes the following steps. In step 52, it is determined whether there is contact from a user of the wireless device 12. In step 54, the identity of the user is ascertained. In step 56, the analyzed images collected by the user are received, stored, and interpreted. In step 58, an emergency response center is contacted regarding the emergency experienced by the user of the wireless device 12. The process then ends.

In summary, the portable security system 10 may be implemented in a variety of environments and settings. Regardless of the environment in which the system 10 is used, it is necessary to provide the location of the system in the event that the alarm is activated. The signal or alert or notification may convey the location of the system 10 to the receiver so that appropriate measures may be taken. As described, the dissemination of location by the signal or alert or notification may be effected in a variety of ways depending on preference, or the type of dwelling in which the system 10 is used, or both.

Moreover, the exemplary embodiments of the present disclosure may be implemented as an application that runs on a cell phone or other portable electronic device. The application may be started and the phone's camera would continuously watch the area it's pointed or directed at. Capabilities of that application may include the following. (i) Sensitivity calibration, that is, the application's software would be able to distinguish and identify changes in the environment (i.e., motion detection) by watching, for example, the opening of a door or window, the approach of a person or animal, smoke detection, signs of a struggle, and other activities that may be discovered through motion detection. (ii) Image analysis, that is, providing image analysis software that may recognize and classify images based on their content. The images analysis system may be trained to look for an open door, fire, a person or other condition. (iii) The application may be configured to transmit information about what it is capturing to a specific person, phone number, or other destination or external source. Consequently, the analysis of the images by the cell phone acts as a triggering mechanism for contacting a plurality of external sources to warn of an emergency. Moreover, a plurality of cameras may be linked together into a networked system to provide for even greater security.

Other possible uses of the exemplary embodiments of the present disclosure may include, but are not limited to, (i) hotel room security while traveling; one could use it while asleep as a warning system or while one is away from the room to detect intruders, (ii) the system could be used by small businesses to protect their premises, (iii) auto security; the camera could be on the seat next to a person watching for a car jacking while one is in the car, or it may be left with the car while it is parked, and (iv) put inside checked in luggage. Security is triggered when the case is opened, unless disarmed. Of course, one skilled in the art may contemplate a plurality of other scenarios where the present disclosure would be valuable in effectively determining emergency situations and providing for quick response times. This system could also be used in non-emergency situations. A parent may want to know when their baby is awake. The child is asleep in a crib or bed and the parent is working outside in the yard. The phone is placed to look for movement and it phones the parent when that movement is detected. One skilled in the art may contemplate a plurality of different situations for using such device.

Additionally, the portable security system 10 may record and store the information gathered (e.g., the emergency situations). Such data or information or history logs may be stored separately in a local or remote database for further processing. This may be a unique database designed solely for storing and analyzing such different types of data or information. Also, once a history of the emergencies is collected and stored for each of the cell phones, that history may be evaluated in the future for determining which emergencies were real and which were false. In other words, the emergencies that took place for each cell phone may be stored and later compared against each other (e.g., for the same cell phone or for a plurality of different cell phones) and ranked in order of most emergencies, least emergencies, most valid emergencies, most false emergencies, etc. All this data/information may be tracked with the use of a data tracing module and analyzed with a data analyzing module in accordance with a data bank of emergencies. Additionally, the system is self improving. In other words, this is a learning system. It can also be useful in improving the detection software when the images are analyzed.

Also, in another exemplary embodiment of the present disclosure, the system may determine that there is a problem by detecting the presence of light. If it is in a dark room and it detects light (e.g., someone switched it on, or it is coming from a flashlight beam) it could trigger an alarm.

The image recognition software program may be packaged and distributed as a software package for downloading to the cell phone where the set of programmable instructions are stored within at least one computer-readable medium, such as a CD-ROM, diskette, etc. The image recognition software program may also be downloaded to the cell phone or other portable electronic device through a network connection connecting the cell phone to a remote computer station, such as a remote server.

Further, although aspects of the present disclosure have been described herein in the context of several particular implementations in particular environments for particular purposes, those of ordinary skill in the art will recognize that its usefulness is not limited thereto and that the present disclosure may be beneficially implemented in any number of environments for any number of purposes. For example, though the disclosure has been described in terms of a security system, all its functionality would be useful in any situation where immediate contact with a third party is required.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A portable security device, comprising:
an image capturing module for capturing one or more images;
an image analysis module in operable communication with the image capturing module, the image analysis module configured to (i) recognize, from the one or more images captured, one or more events related to detection of moving objects, (ii) selectively identify a finite number of spatial relationships of the moving objects, (iii) analyze the one or more images within the portable security device to classify the finite number of spatial relationships of the moving objects corresponding to predefined moving object data stored on a data storage unit located within the portable security device, the predefined moving object data corresponding to a type of movement indicative of a particular type of emergency situation, wherein each type of emergency situation includes a specific type of movement associated therewith, wherein the type of movement associated with an emergency situation is determined from the group consisting of an opening door, an opening window, a fire, smoke, a struggle, an approaching animal, and a carjacking; and
an image transmission module for transmitting the one or more images recognized, selectively identified, and analyzed by the image analysis module to one or more external sources in response to a classification of the finite number of spatial relationships of moving objects as indicative of a particular type of emergency situation, wherein the one or more external sources associated with the particular type of emergency situation are automatically contacted in response to the classification indicating the particular type of emergency situation.

2. The portable security device according to claim 1, wherein the portable security device comprises a cell phone.

3. The portable security device according to claim 1, wherein the image capturing module comprises a camera.

4. The portable security device according to claim 1, wherein the image transmission module comprises a Global Positioning System (GPS).

5. The portable security device according to claim 4, wherein the image transmission module relays a location of the security device and an identity of a user of the security device.

6. The portable security device according to claim 4, wherein the image transmission module bidirectionally communicates one or more visual or audible notifications to the one or more external sources.

7. The portable security device according to claim 6, wherein the one or more external sources are pre-configured to respond based on (i) the visual or audio notifications received by the security device and (ii) a user's pre-established triggering events.

8. The portable security device according to claim 1, wherein the one or more external sources include one or more of at least a security provider, one or more security services, and one or more people having one or more electronic communication devices.

9. A method for providing security via a portable security device, the method comprising:
   capturing one or more images;
       recognizing, from the one or more images captured, one or more events related to detection of moving objects;
       selectively identifying a finite number of spatial relationships of the moving objects;
       analyzing the one or more images within the portable security device to classify the finite number of spatial relationships of the moving objects corresponding to predefined moving object data stored on a data storage unit located within the portable security device, the predefined moving object data corresponding to a type of movement;
       determining whether the classified finite number of spatial relationships of the moving objects corresponding to the predefined moving object data corresponds to a type of movement associated with a particular type of emergency situation, wherein the type of movement associated with an emergency situation is determined from the group consisting of an opening door, an opening window, a fire, smoke, a struggle, an approaching animal, and a cariackinq; and
       transmitting the one or more images recognized, selectively identified, and analyzed to one or more external sources responsive to a determined emergency situation.

10. The method according to claim 9, wherein the portable security device comprises a cell phone.

11. The method according to claim 9, further comprising using a camera for the image capturing.

12. The method according to claim 9, further comprising:
   including a Global Positioning System (GPS); and
   relaying a location of the security device and an identity of a user of the security device.

13. The method according to claim 12, further comprising bidirectionally communicating one or more visual or audible notifications to the one or more external sources.

14. The method according to claim 13, further comprising pre-configuring the one or more external sources to respond based on (i) the visual or audio notifications received by the security device and (ii) a user's pre-established triggering events.

15. The method according to claim 9, wherein the one or more external sources include one or more of at least a security provider, one or more security services, and one or more people having one or more electronic communication devices.

16. A system for providing security via a portable security device, the system comprising:
   a processor;
   a computer-readable storage medium in communication with a processor, the computer-readable storage medium comprising one or more programming instructions executable by the processor for:
   capturing one or more images;
   recognizing, from the one or more images captured, one or more events related to detection of moving objects;
   selectively identifying a finite number of spatial relationships of the moving objects;
   analyzing the one or more images within the portable security device to classify the finite number of spatial relationships of the moving objects corresponding to predefined moving object data stored on a data storage unit located within the portable security device, the predefined moving object data corresponding to a type of movement;
   determining whether the classified finite number of spatial relationships of the moving objects corresponding to the predefined moving object data corresponds to a type of movement associated with a particular type of emergency situation, wherein each type of emergency situation includes a specific type of movement associated therewith wherein the type of movement associated with an emergency situation is determined from the group consisting of an opening door, an opening window, a fire, smoke, a struggle, an approaching animal, and a carjacking;
   contacting one or more external sources corresponding to the particular type of emergency situation associated with the determined specific type of movement; and
   transmitting the one or more images recognized, selectively identified, and analyzed to the one or more external sources corresponding to the in accordance with a determined specific emergency situation.

17. The system according to claim 16, further comprising relaying a location of the security device and an identity of a user of the security device.

18. The system according to claim 16, further comprising bidirectionally communicating one or more visual or audible notifications to the one or more external sources.

19. The system according to claim 18, further comprising pre-configuring the one or more external sources to respond based on (i) the visual or audio notifications received by the security device and (ii) a user's pre-established triggering events.

* * * * *